United States Statutory Invention Registration [19]

[11] Reg. Number: H770

Kline et al. [43] Published: Apr. 3, 1990

[54] TRACER TRAINING PROJECTILE

[75] Inventors: Roy W. Kline, Newton, N.J.; Sung-Kwong Chung, Brooklyn, N.Y.

[73] Assignee: The United States of America as represented by the Secretary of the Army, Washington, D.C.

[21] Appl. No.: 393,151

[22] Filed: Aug. 11, 1989

[51] Int. Cl.[4] ..... F42B 13/20

[52] U.S. Cl. ..... 102/513; 102/529

*Primary Examiner*—Harold J. Tudor

*Attorney, Agent, or Firm*—Robert P. Gibson; Edward Goldberg; Edward F. Costigan

[57] ABSTRACT

A tracer training bullet which can be assembled into a conventional cartridge case and fired in a conventional M2 machine gun is disclosed. The bullet consists of a main body of relatively low strength material which is segmented so that, if not restrained, it will bend under the centrifugal rotational force imparted to the segments by the spinning action of the projectile when fired. The bending of the projectile segments away from their central axis is ordinarily prevented by a retainer in the form of a spider. The spider is made of a relatively low temperature melting material, preferably aluminum, having a given thermal mass. The burn of the tracer material during the flight of the bullet toward a target weakens the retainer to the point of rupture after the bullet has travelled a given distance toward a target position. After the target position is passed, the securement member is destroyed by the high temperature burning action and the segments of the projectile bend or flex apart. This destroys the aerodynamic characteristics of the bullet and reduces its maximum range beyond the target distance.

9 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRACER TRAINING PROJECTILE

GOVERNMENT INTEREST

The invention described herein may be manufactured, used and licensed by or for the Government for Governmental purposes without payment to us of any royalties thereon.

RELATED APPLICATION

This application is related to copending application Ser. No. 07/379,320, filed July 7, 1989, entitled "PROBE NOSE TRAINING CARTRIDGE", now Statutory Invention Registration H700, issued Nov. 7, 1989.

BACKGROUND OF THE INVENTION

This invention relates to live training ammunition which has a limited range while still providing realistic training.

A standard caliber 0.50, M33 bullet fired from an M2 machine gun has a maximum range of over 5 kilometers. Consequently, training ranges for such ammunition using much shorter target ranges, for example, 1000 meters, require considerable area and are few in number.

It would be very desirable to provide a structure for such ammunition which provides realistic training at the designated target distance but wherein the bullets have a limited range so that smaller areas can be used for training.

Plastic ball ammunition and steel probe nose rounds have been proposed for this purpose. The maximum range of a plastic ball has been found to be about 2900 meters while the maximum range of a steel probe nose is about 3900 meters. A maximum range of 2500 meters is preferable. A further drawback of the 0.50 caliber plastic ball rounds is that their mass is insufficient to generate enough recoil to recycle the M2 machine gun. Finally, neither of the rounds had an appearance similar to the standard caliber 0.50, M33 ball and, therefore, detracted from training realism.

BRIEF DESCRIPTION OF THE INVENTION

In accordance with the present invention, a tracer-type projectile is provided which has the same external envelope as the caliber 0.50, M33 ball and can be fired from the M2 machine gun. The main body of the projectile is made of a material having low strength. Thus the body can be of copper or a high lead-content iron which is structurally weak in comparison to the material used for the standard caliber 0.50 ball. The body is then at least partially longitudinally sectioned. The longitudinal segments are firmly held together by a relatively low melting point retainer of a given thermal mass, such as a spider which is suitably installed around the segmented body portions. The retainer has a relatively low melting point relative to steel, and preferably loses its structural integrity after a given time at a temperature under about 1000° K. Suitable aluminum alloys can be used for the retainer. The retainer need extend for only a portion of the length of the projectile.

A conventional cylindrical opening, or bore, is formed along the axis of the body of the projectile and a conventional high temperature burning tracer material is poured into the bore in a conventional manner. Alternatively, a non-fluid rubber base insert of tracer material can be inserted into the bore. Such tracer materials burn at temperatures from 2500° K. to 3000° K.

The function of the retainer is to hold the segmented body together during the firing of the round and its flight to the target. When such a round is fired at a target at a range of 1000 meters or less, the round retains its integrity to a point just prior to the 1000 meter range as determined by the retainer thermal mass and melting point. At that point, the structural integrity of the retainer is destroyed due to high temperature burning of the tracer material. The bullet is also spinning at a high rate and a substantial centrifugal force is applied to the bullet segments. Therefore, once the retainer fails, the segmented portions of the body of the bullet flare outwardly. This outward flaring produces an extremely inefficient aerodynamic shape so that the range of the projectile is thereafter considerably reduced. Preferably the projectile will travel no further than about 1000 meters before breakup and 400 meters thereafter in a tumbling, rapidly decelerating mode. This occurs even if the bullet does not intercept the target at which it is aimed.

The breaking open of the projectile comes from a bending moment due to the centrifugal force applied to the weakened bullet sections and tends to pull the body segments outwardly until the forces on the body are balanced. Yawing motion and high aerodynamic drag can be expected at the onset of the opening of the body sections. Moreover, because one side of the body segments may open more than others, the projectile will be made even more unstable to shorten the total range following its initial travel on an accurate ballistic path.

Other features and advantages of the present invention will become apparent from the following description of the invention which refers to the accompanying drawings.

DETAILED DESCRIPTION OF THE DRAWINGS

Figure 1:
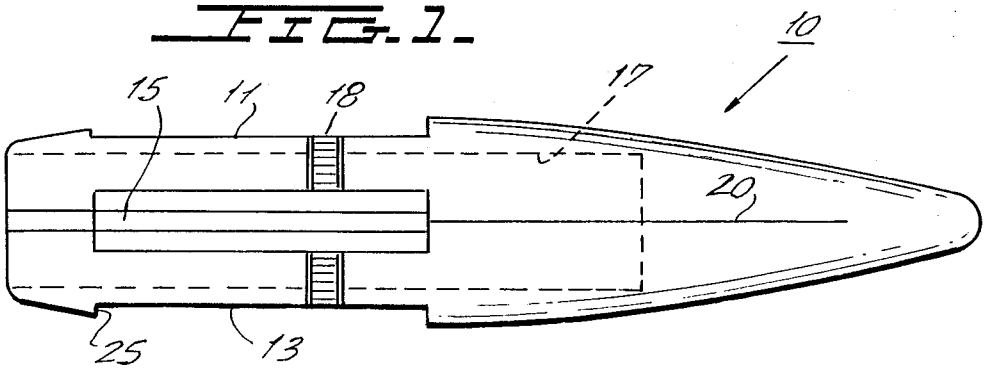
FIG. 1 is an elevation view of the projectile body used for the present invention.
Figure 2:
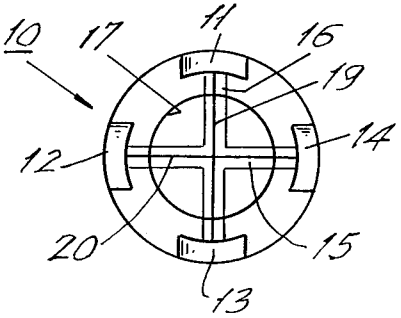
FIG. 2 is an end view of the left-hand end of FIG. 1.

Referring first to FIGS. 1 and 2, there is shown therein the projectile body 10 which is preferably made of a material which is structurally weak compared to steel and can, for example, be made of copper or a high lead content iron. Preferably the strength of the material is such that an elongated segment thereof, which is later described, will readily bend inelastically under the influence of the centrifugal force produced by the spin of a caliber 0.50, M33 bullet fired from the barrel of an M2 machine gun.

Four slots 11 through 14 are positioned around the periphery of body 10 and extend for only a portion of its length. Two slots 15 and 16 extend perpendicularly to one another and across the full diameter of the body 10 and are aligned with the centers of slots 11, 12, 13 and 14, respectively. These slots extend to the left-hand end of the projectile in FIG. 1 and provide for assembly access to a spider retainer which will be identified hereinafter.

Figure 6:
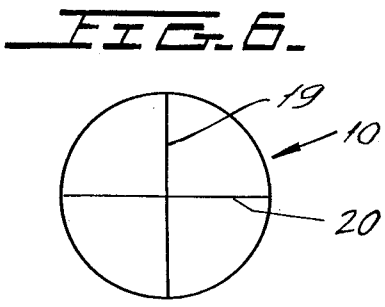
FIG. 6 is a cross-sectional view of FIG. 3 taken across the section line 6—6 in FIG. 3.

The projectile is also provided with a central opening or bore 17 which, as will be later described, receives a tracer compound which burns at high temperature when the bullet is fired. The exterior surface of the body 10 contains a standard knurl 18 which permits the assembly of the bullet to a standard cartridge in conventional fashion. Preferably, the region of body 10 extending from the end of slots 15 and 16 for a major portion of the length of the projectile is also pre-cut by perpendicular intersecting cuts 19 and 20 which are best shown in FIG. 6.

After the preparation and slotting of the projectile body 10, a retainer in the form of a spider 21, which is of a relatively low melting point material such as aluminum, is inserted through the perpendicular slots 15 and 16 and is snapped into place within the slots 11 through 14 of the projectile body 10. By a relatively low melting point material is meant one which will lose its structural integrity due to the high temperature burn of a tracer compound after the bullet has traveled for a certain length of time. For example, aluminum, having a melting point under about 1000° K., will lose its structural integrity after the bullet has travelled a given distance to a target.

Figure 5:
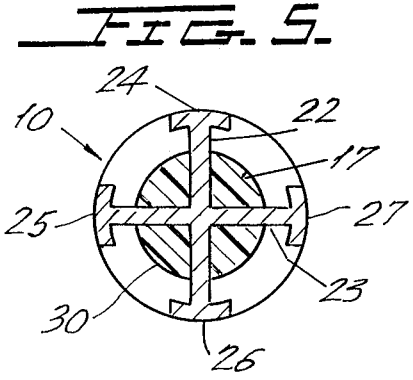
FIG. 5 is a cross-sectional view of FIG. 3 taken across the section line 5—5 in FIG. 3.

The spider 21 consists of intersecting, perpendicular planar sections 22 and 23, best shown in FIG. 5. Sections 22 and 23 are provided with elongated heads 24 through 27 which are shown in FIGS. 4 through 8 which are snapped into position within slots 11 through 14, respectively.

In assembling the spider 21, it is simply pressed into position and over the notches such as notch 25 of FIG. 1, which is the rear notch for the slot 13, and the heads 24 through 27 snap into their respective slot. Note that the slotted body 10 is sufficiently flexible to permit this snap action. When the head members 24 through 27 are snapped into position in their respective slots 11 through 14, they will define a smooth, continuous outer surface for the bullet.

Figure 7:
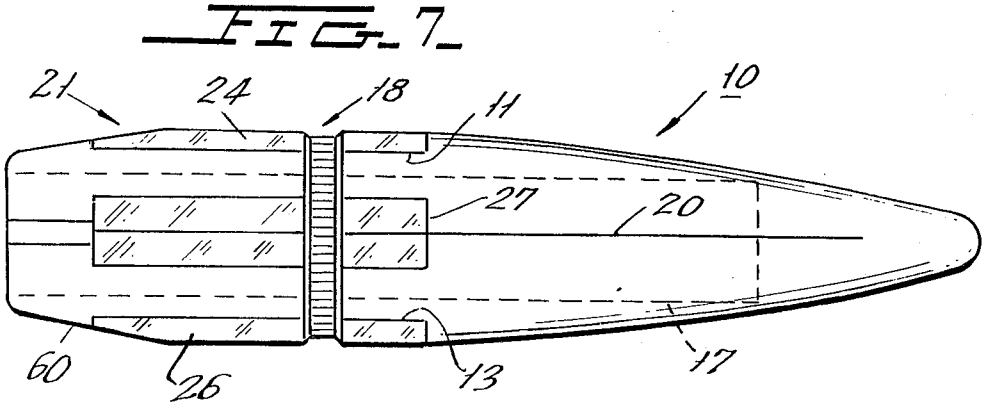
FIG. 7 is an elevation view of the projectile of FIG. 3 after fully assembled.
Figure 8:
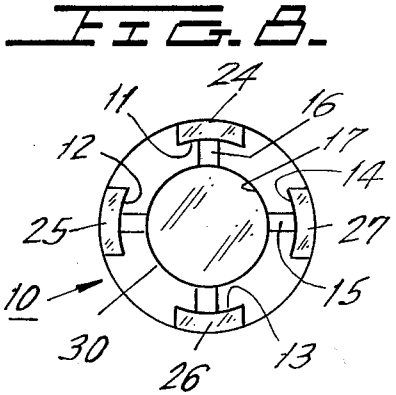
FIG. 8 is an end view of the left-hand end of FIG. 7.
Figure 3:
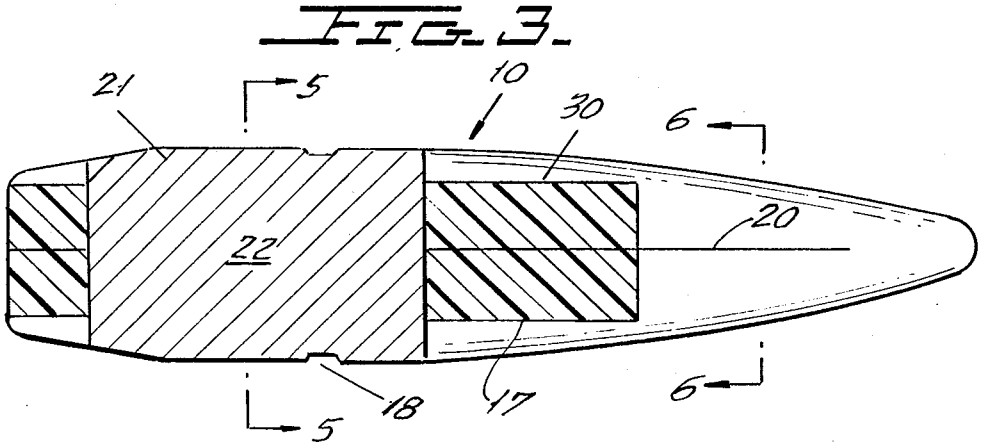
FIG. 3 is a longitudinal cross-sectional view of the projectile of FIGS. 1 and 2 taken across the section line 3—3 in FIG. 4.
Figure 4:
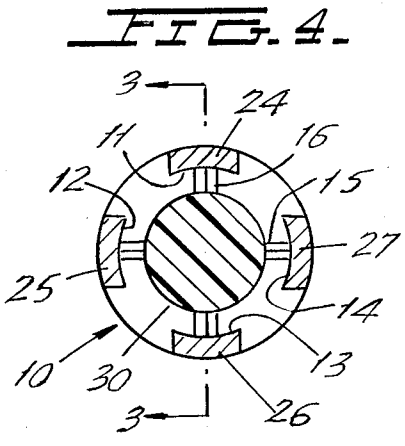
FIG. 4 is an end view of the left-hand end of the projectile of FIG. 3 after tracer material has been loaded and the spider has been assembled over the projectile body.

FIGS. 7 and 8 show the projectile after the spider 21 has been snapped into place. Note that the exterior surface of heads 24 through 27 has a continuation of the knurl 18 which encircles the entire bullet as is best shown in FIG. 7.

The rear end of the bullet of FIG. 7 has a rearwardly projecting conical region 60 which conforms to the profile of the rear section of a conventional bullet, and enables the assembly of the bullet into a standard cartridge. The cartridge is not shown in the drawings but its structure is well known to those skilled in the art.

For the next step in the manufacturing process, a tracer material body 30 of conventional structure is poured or fitted into the opening 17. Such tracer material can be poured and set in site within opening 17 or can be a pre-set rubber base type of material which is simply fitted into the bore 17.

After suitable finishing and cleaning, the structure of the tracer training projectile is completed and the projectile can be loaded into a cartridge case in conventional manner.

The operation of the novel tracer training projectile of the invention can now be considered. Assume that the projectile is conventionally fired by an M2 machine gun. The bullet leaves the muzzle with a given muzzle velocity and spin rate imparted by the rifling of the machine gun barrel. The spin imparts stability to the bullet. The assembled round is loaded by the trainee and fired by the trainee in conventional and realistic fashion The limited range of the bullet is immaterial to the trainee and it behaves like a conventional bullet until it passes beyond the target. The bullet is made to have the same mass as a conventional round so that the machine gun is properly recycled and exhibits realistic recoil, noise and flash.

The tracer material ignites with the firing of the cartridge and, during the flight of the bullet toward a target, burns at a temperature, for example, of 2500° K. to 3000° K. The body of the normal M33 round has a sufficiently high melting point that the tracer burn does not affect its strength. However, the aluminum spider 22, used in the training projectile of the invention, has a much lower melting point than that of steel and, for example, is lower than about 1000° K.

The projectile body 10 is also selected as one which has low physical strength compared to steel and may, for example, be copper so that the principal structural strength for the projectile which resists its radial rupture as a result of the centrifugal force is the aluminum spider.

Figure 9:
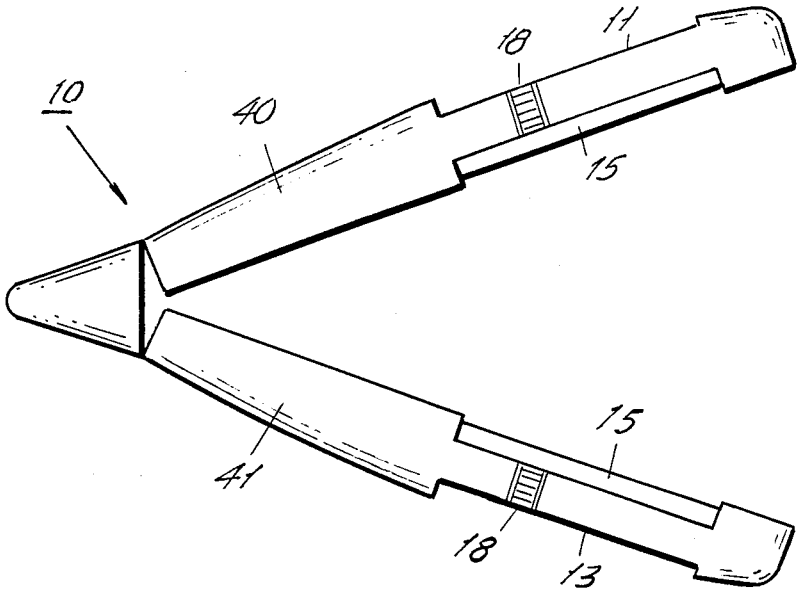
FIG. 9 shows the projectile of the prior figures in one mode of rupture during its operation.

As the projectile travels toward the target and after it reaches a distance of about 800 meters, the aluminum spider 21 loses its structural integrity and is destroyed. The centrifugal force applied to the remaining body 10 is sufficiently high as to distort the body, causing individual body segments to spread apart. Thus, as shown in FIG. 9, in one rupture mode for the projectile 10, two slotted segments 40 and 41 are shown flared outwardly so that the aerodynamic drag on the projectile is greatly increased and the projectile stability is considerably reduced. Consequently, the range of the projectile is drastically reduced, for example, to a total of about 1400 meters maximum.

Figure 10:
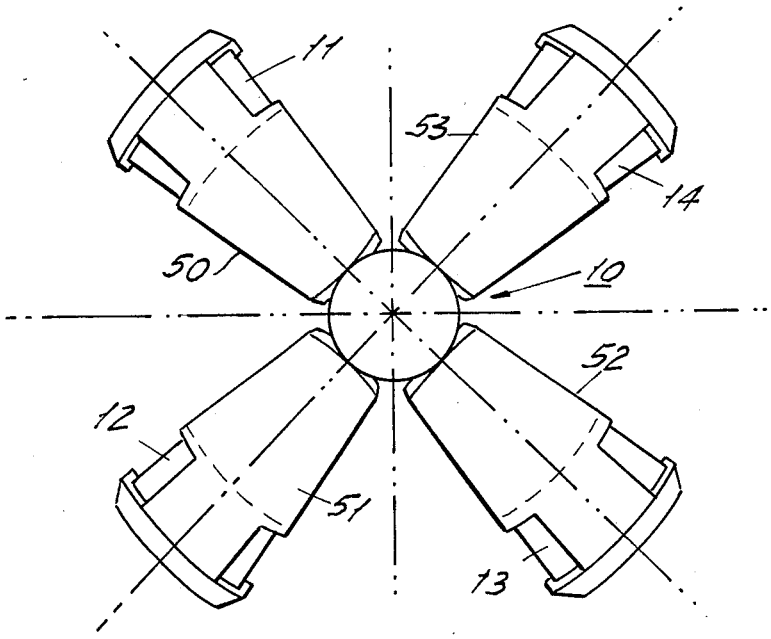
FIG. 10 is similar to FIG. 9 but shows a second mode of rupture for the projectile.

The rupture mode for the projectile of FIGS. 1 and 2 is shown in FIG. 10 wherein four segments including segments 50, 51, 52 and 53 bend radially bend outwardly, again to provide a high aerodynamic drag on the projectile which tends to drastically reduce its maximum range after having travelled with high accuracy to the target range.

It will be apparent that the body 10 can be subdivided into as many segments as desired. Also, the slotting of the segments can be for any desired length of the projectile body.

Other restraining structures for holding the main body of the projectile together until a rupture point is reached can be used other than the spider which is disclosed. By way of example, a simple size hoop or plural spaced hoops can be used.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

What is claimed is:

1. A reduced range bullet for a training cartridge; said bullet having a main elongated body having a nose end and a rear end; said rear end being adapted for mounting in a cartridge case; said main body having a central bore extending along its axis from its said rear end for a given axial distance and having a plurality of longitudinal slots which extend along at least a portion of the length of said body and separate said body into a plurality of longitudinal segments which are joined together at at least the nose end of said body; said central bore being at least partly filled with a high temperature burning tracer material; and a retainer member fixed to said body and holding said segments together and in a position to form a smooth aerodynamically shaped projectile profile; said retainer member having a melting temperature and thermal mass which is such that the mechanical integrity of said retainer member is destroyed after a predetermined burn time of said tracer material whereby said retainer member is thereafter incapable of preventing the outward bending of said segments due to the centrifugal force of the spin of said projectile induced by the firing of said projectile from a rifled barrel.

2. The bullet of claim 1 wherein said main body is made of a material having a mechanical strength such that said segments will readily bend outwardly from the axis of said body due to said centrifugal force when the restraining force of said retainer member is removed.

3. The bullet of claim 1 wherein said retainer member is made of aluminum.

4. The bullet of claim 2 wherein said retainer member is made of aluminum.

5. The bullet of claim 1 wherein said retainer member is spider-shaped in lateral cross-section and has peripherally extending heads at the ends of each of the arms of the spider; the outer surface of each of the said heads being smoothly continuous with the outer surface of said body.

6. The bullet of claim 5 wherein said retainer member is made of aluminum.

7. The bullet of claim 5 wherein said longitudinal slots extend from the peripheral center of each of said heads and toward said nose of said body.

8. The bullet of claim 7 wherein said main body is made of a material having a mechanical strength such that said segments will readily bend outwardly from the axis of said body due to said centrifugal force when the restraining force of said retainer member is removed.

9. The bullet of claim 8 wherein said retainer member is made of aluminum.

* * * * *